US006433818B1

(12) United States Patent
Steinberg et al.

(10) Patent No.: US 6,433,818 B1
(45) Date of Patent: Aug. 13, 2002

(54) DIGITAL CAMERA WITH BIOMETRIC SECURITY

(75) Inventors: Eran Steinberg, San Francisco; Yuri Prilutsky, San Mateo, both of CA (US)

(73) Assignee: FotoNation, Inc., San Francisco, CA (US)

( * ) Notice: Subject to any disclaimer, the term of this patent is extended or adjusted under 35 U.S.C. 154(b) by 0 days.

(21) Appl. No.: 09/353,915

(22) Filed: Jul. 15, 1999

Related U.S. Application Data

(63) Continuation-in-part of application No. 09/187,706, filed on Nov. 6, 1998, which is a continuation of application No. 09/211,922, filed on Dec. 14, 1998, and a continuation of application No. 09/313,131, filed on May 17, 1999.

(51) Int. Cl.[7] .............................. H04N 7/18; H04N 7/00; G06K 9/00
(52) U.S. Cl. ........................ 348/161; 348/552; 382/116
(58) Field of Search ............................ 348/5.5, 77, 78, 348/160, 161, 207, 213, 220, 232, 333, 552; 713/182, 186; 382/115, 116, 117, 118

(56) References Cited

U.S. PATENT DOCUMENTS

| 4,148,372 | A |   | 4/1979 | Schroeder ................... 180/114 |
| 4,916,435 | A | * | 4/1990 | Fuller |
| 5,124,814 | A |   | 6/1992 | Takahashi et al. .......... 358/906 |
| 5,142,324 | A | * | 8/1992 | Ito |
| 5,182,635 | A |   | 1/1993 | Nakashima et al. .......... 358/12 |
| 5,220,366 | A |   | 6/1993 | King ........................... 354/76 |
| 5,392,356 | A |   | 2/1995 | Konno et al. .................. 380/23 |
| 5,396,546 | A |   | 3/1995 | Remillard ..................... 379/96 |

(List continued on next page.)

FOREIGN PATENT DOCUMENTS

| GB | WO97/36426 | * | 10/1997 | .......... H04N/7/167 |
| JP | 363054070 A | * | 3/1988 | .......... H04N/5/222 |
| JP | 406250248 A | * | 9/1994 | ............ G03B/7/00 |
| JP | 09233453 A | * | 9/1997 | ............ H04N/7/16 |

*Primary Examiner*—Wendy R. Garber
*Assistant Examiner*—Jacqueline Wilson
(74) *Attorney, Agent, or Firm*—David H. Jaffer; Pillsbury Winthrop LLP

(57) ABSTRACT

A programmable digital camera requiring a programming password to be entered to access the camera's programmability. The camera further includes programming so as to allow the camera to be operated only for a specified time interval, after which the camera becomes inoperable until the programming password is again entered and the camera is programmed to operate for another interval of time. An alternate embodiment of the invention includes a programmable digital camera as above described wherein the camera is programmed to only capture a set number of images, at which point the programming password must again be entered and the camera reset for another quantity of images. A further alternate embodiment includes a camera system with a separate transmitter for radiating a signal designed to cover a designated area, the signal being modulated with a camera operational code. The camera is equipped with a corresponding receiver and demodulator to receive the operational code. The camera is programmed to check for the operational code periodically, and if the code is not received, the camera automatically shuts down, thereby limiting operation of the camera to the designated area. A still further embodiment includes a camera with a built-in apparatus for acquiring measured biometric data of a potential user, and comparing it with corresponding biometric signature data entered in the camera, and allowing camera operation only if there is a match.

2 Claims, 13 Drawing Sheets

U.S. PATENT DOCUMENTS

| | | | |
|---|---|---|---|
| 5,444,483 A | 8/1995 | Maeda | 348/231 |
| 5,467,403 A * | 11/1995 | Fishbine et al. | 382/116 |
| 5,475,441 A | 12/1995 | Parulski et al. | 348/552 |
| 5,477,264 A | 12/1995 | Sarbadhikari et al. | 348/231 |
| 5,550,646 A | 8/1996 | Hassan et al. | 358/442 |
| 5,577,107 A | 11/1996 | Inagaki | 379/96 |
| 5,581,613 A | 12/1996 | Nagashima et al. | 380/21 |
| 5,594,311 A | 1/1997 | Thandiwe | 320/2 |
| 5,594,736 A | 1/1997 | Tatsumi et al. | 370/474 |
| 5,625,410 A | 4/1997 | Washino et al. | 348/154 |
| 5,633,678 A | 5/1997 | Parulski et al. | 348/232 |
| 5,650,861 A | 7/1997 | Nakajima et al. | 358/433 |
| 5,675,003 A | 10/1997 | Andersen et al. | 364/514 |
| 5,708,856 A | 1/1998 | Cloutier | 396/6 |
| 5,754,227 A | 5/1998 | Fukuoka | 348/232 |
| 5,896,128 A | 4/1999 | Boyer | 345/327 |
| 5,987,155 A * | 11/1999 | Dunn et al. | 382/116 |
| 6,067,624 A * | 5/2000 | Kuno | 713/202 |
| 6,088,585 A * | 7/2000 | Schmitt et al. | 455/411 |
| 6,177,950 B1 * | 1/2001 | Robb | 348/14 |

\* cited by examiner

DIGITAL CAMERA WITH BIOMETRIC SECURITY

This is a continuation-in-part application of U.S. patent application Ser. No. 09/187,706 filed Nov. 6, 1998; U.S. patent application Ser. No. 09/211,922 filed Dec. 14, 1998; and U.S. patent application Ser. No. 09/313,131 filed May 17, 1999.

BACKGROUND OF THE INVENTION

1. Field of the Invention

The present invention relates generally to digital cameras, and more particularly to a method and apparatus for eliminating unauthorized use of a camera, and for deterring camera theft by programming the camera to operate only under predetermined conditions. This invention is related to the inventions described in U.S. patent application Ser. No. 09/187,706 filed Nov. 6, 1998; U.S. patent application Ser. No. 09/211,922 filed Dec. 14, 1998; and U.S. patent application Ser. No. 09/313,131 filed May 17, 1999, the disclosures of which are incorporated herein by reference.

2. Description of the Prior Art

Digital cameras prior to the present invention have not been configured to prevent unauthorized use or discourage theft. In the area of film-based cameras, a mechanical apparatus for discouraging unauthorized use of a rental camera is disclosed in U. S. Pat. No. 5,708,856 by Cloutier. It involves requiring the removal of a locking screw prior to loading or unloading film, a process which appears to make it more difficult, but not impossible for a borrower to remove and replace film. In commercial or industrial facilities of various kinds, numerous expensive digital cameras are in use. Due to the small size and general applicability of present digital cameras, unauthorized use and theft are matters for concern. Similarly, in the case of rental cameras, some means for encouraging the return of a digital rental camera is needed, as well as a means for limiting the use of a camera, for example to a predetermined time interval, or a fixed number of images according to a rental agreement. In the case where a digital camera is used for business purposes, the company needs a way of discouraging workers from using company cameras for non-work related purposes.

The use of biometric measurement as means of identification is disclosed in U.S. Pat. No. 5,291,560 by Daughman. It describes a system for rapid and automatic identification of persons, with very high reliability and confidence levels. The iris of the eye is used as an optical fingerprint, having a highly detailed pattern that is unique for each individual and stable over many years. U.S. Pat. No. 5,572,596 by Wildes et al. attempts to overcome a usability issue of forcing the user to create a physical contact with the biometric measurement device by creating a noninvasive iris recognition system.

SUMMARY

It is therefore an object of the present invention to provide a digital camera system with theft protection.

It is a still further object of the present invention to provide a digital camera that can be operated by a user for only a predetermined time interval.

It is another object of the present invention to provide a digital camera that a user can only operate to capture a predetermined number of images.

It is an object of the present invention to provide a rental digital camera that automatically encrypts captured images, that can only be viewed by a renter after retuning the camera to the lender for decryption.

It is a further object of the present invention to provide a camera including a biometric measurement apparatus and corresponding camera enabling apparatus for limiting the camera use to an authorized person.

Briefly, a preferred embodiment of the present invention includes a programmable digital camera requiring a programming password to be entered to access the camera's programmability. The camera further includes programming so as to allow the camera to be operated only for a specified time interval, after which the camera becomes inoperable until the programming password is again entered and the camera is programmed to operate for another interval of time. An alternate embodiment of the invention includes a programmable digital camera as above described wherein the camera is programmed to only capture a set number of images, at which point the programming password must again be entered and the camera reset for another quantity of images. A further alternate embodiment includes a camera system with a separate transmitter for radiating a signal designed to cover a designated area, the signal being modulated with a camera operational code. The camera is equipped with a corresponding receiver and demodulator to receive the operational code. The camera is programmed to check for the operational code periodically, and if the code is not received, the camera automatically shuts down, thereby limiting operation of the camera to the designated area.

A still further embodiment includes a camera with a built-in apparatus for acquiring measured biometric data of a potential user, and comparing it with corresponding biometric signature data entered in the camera, and allowing camera operation only if there is a match.

An advantage of the present invention is that it provides protection against theft by rendering a camera inoperable by an unauthorized user.

A further advantage of the present invention is that it provides a lender the ability to restrict the use of a rental camera to a fixed number of images, thereby encouraging the return of the camera.

A still further advantage of the present invention is that it provides a lender the ability to restrict the use of a rental camera to a fixed time period.

Another advantage of the present invention is that it provides a camera that can only be used in a specific physical area.

A still further advantage of the present invention is that it provides a camera that can be restricted in use to an office, and thereby avoid its use for recreational purposes.

Another advantage of the present invention is that is provides a non-intimidating and transparent way of collecting biometric data due to the fact that a user naturally brings both eyes and fingers in contact with the camera.

IN THE DRAWING

DETAILED DESCRIPTION OF THE PREFERRED EMBODIMENTS

Figure 1:
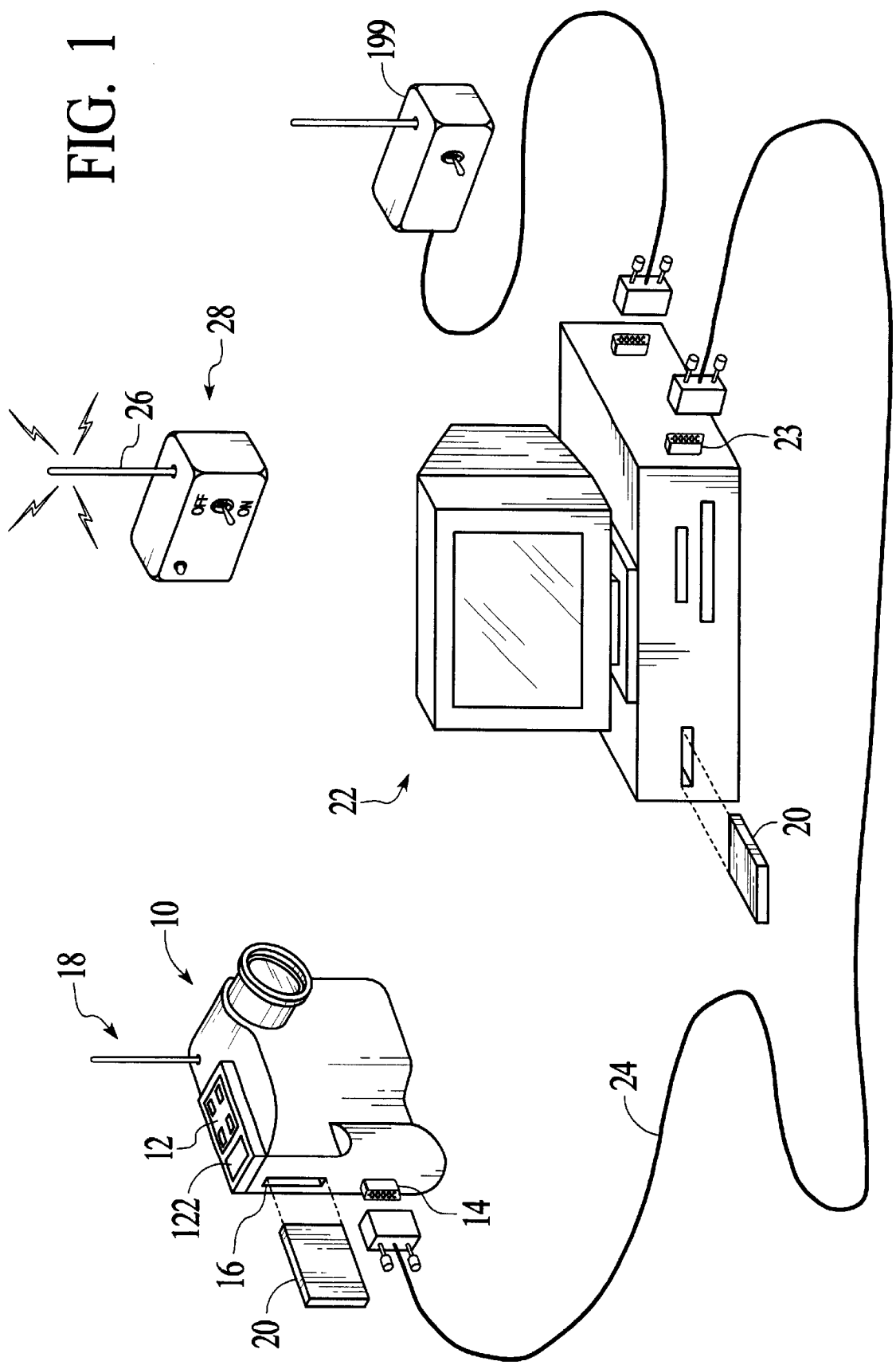
FIG. 1 illustrates the apparatus of the various embodiments of the present invention.

Referring now to FIG. 1 of the drawing, there is an illustration of the apparatus of the preferred embodiments of the present invention. A digital camera 10 includes at least one of four programming inputs, including a keypad 12, a connector 14, a card input 16, and an antenna 18. In the case where the card input 16 is used, a card 20 is a key part of the invention, containing the novel data for the camera. Alternatively, the card has a processor and memory for use in a camera and card operable combination. The connector 14, if used for input, is typically connected to a computer system 22 through a cable 24 for programming the camera 10.

The antenna 18 is for reception of modulated signals, such as radio frequency or infrared, radiated from an antenna 26 of a transmitter 28, the modulation containing an operation code to begin operation of the camera 10, and a renewal code for continuing the camera operation. In one embodiment, the operational code and renewal code are the same. The details of the various embodiments will be fully described in the following specification in reference to the figures of the drawing.

Figure 2:
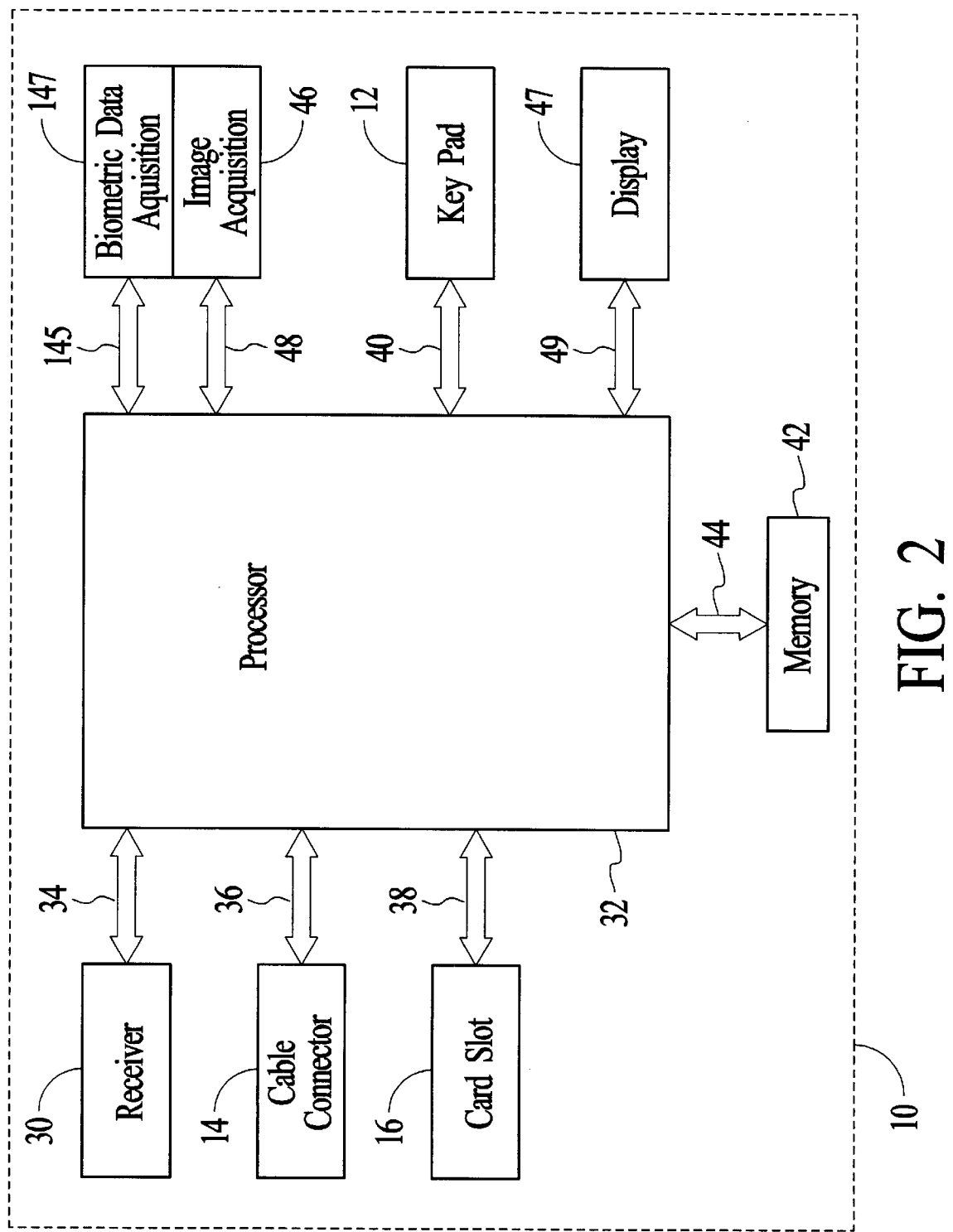
FIG. 2 is a block diagram of the major elements of the programmable camera of the present invention.

FIG. 2 illustrates the major components of the programmable digital camera 10 of the present invention. The camera 10 receives programming data and sends image data by way of one or more of the input or input/output elements including the keypad 12, the cable connector 14, card slot 16, or receiver 30 by way of antenna 18 of FIG. 1. The input/outputs 12, 14, 16, 30 pass programming data to a processor 32 through buses 34, 36, 38 and 40. Data and programming are stored in memory 42 connected to processor 32 through bus 44. The facility for acquisition of image data is indicated by image acquisition block 46 connected to the processor 32 through bus 48. The display 47, connected to processor 32 through bus 49, supplies visual information to the user. The specific items displayed are a matter of design choice, and the various options that will be apparent to those skilled in the art are included in the present invention. For example, one embodiment of the display shows the number of images allowed, and the number unused/remaining. Another embodiment wherein the camera or card is pre-programmed to allow operation for a specified time, includes the display 47 indicating operability, for example showing the date and time of allowed use, and date and time of expiration of use, or if the allowance is simply for a total amount of operation time, the display 47 would show the total amount of allowed time remaining.

Figure 3:
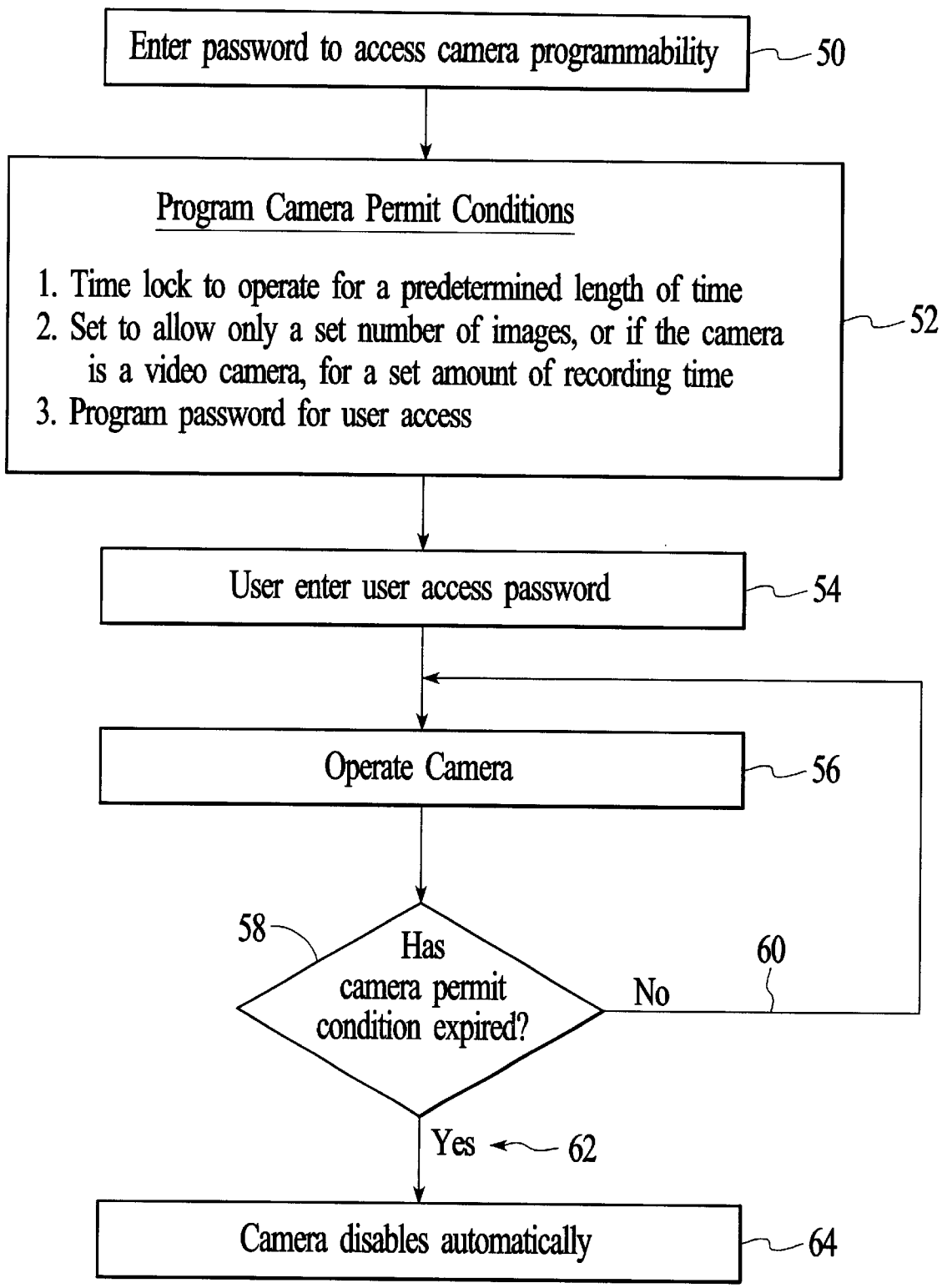
FIG. 3 is a flow chart of an embodiment wherein a lender can program the camera to operate for a set time period or number of images.

A preferred embodiment of the present invention is illustrated in the flow chart of FIG. 3. This embodiment applies to situations wherein the camera "owner" has a need to restrict the use of the camera by a user. A preferred example of this is a camera rental situation. The camera is programmable, and requires entry of a programming password in order to access the camera programmability. This feature and the entry of a programming password is indicated by block 50. Block 52 lists programmable conditions that can be set by the owner, including a "time lock" which sets the camera to allow operation over a time span of a certain number of hours or days. Another option allows the owner to set the camera to capture only a specified number of images. Alternatively, if the digital camera is a digital video camera, the owner would set the camera to allow a fixed amount of recording time. The owner can also program a user access password to enable the use of the programmed camera. In operation, the user will then enter the access password (block 54) and operate the camera (block 56). The camera then keeps track of the permit condition i.e., elapsed time, or number of images or recording time, and if the condition is not expired, operation is allowed, as indicated by block 58 and path 60. If the permit condition is expired 62, the camera automatically disables image taking (block 64).

Figure 4:
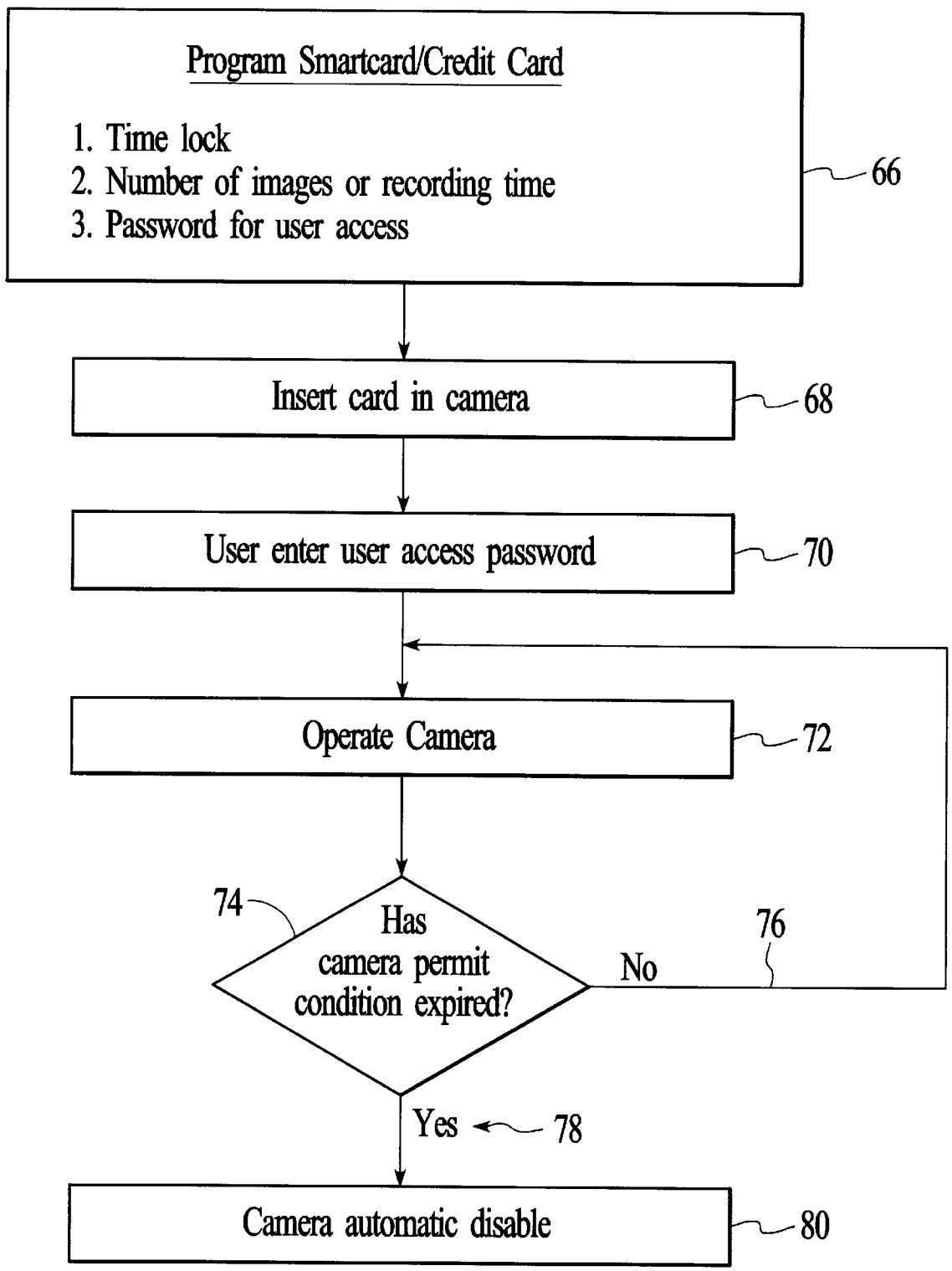
FIG. 4 is flow chart wherein the camera is programmed through use of a smart card.

FIG. 4 illustrates an alternative embodiment wherein the owner programs a Smart Card or credit card with the required data, including a time lock and/or number of images or recording time, and optionally a user access password (block 66). In operation, the Smart Card or credit card 20 (FIG. 1) is then inserted into the camera 10 receptacle 16 (block 68). Entering the user password (block 70) is optional but is preferably implemented if the card 20 is an off-the-shelf standard item. The descriptions and operations associated with item numbers 70–80 of FIG. 4 are operationally the same as for item numbers 54–64 of FIG. 3.

Figure 5:
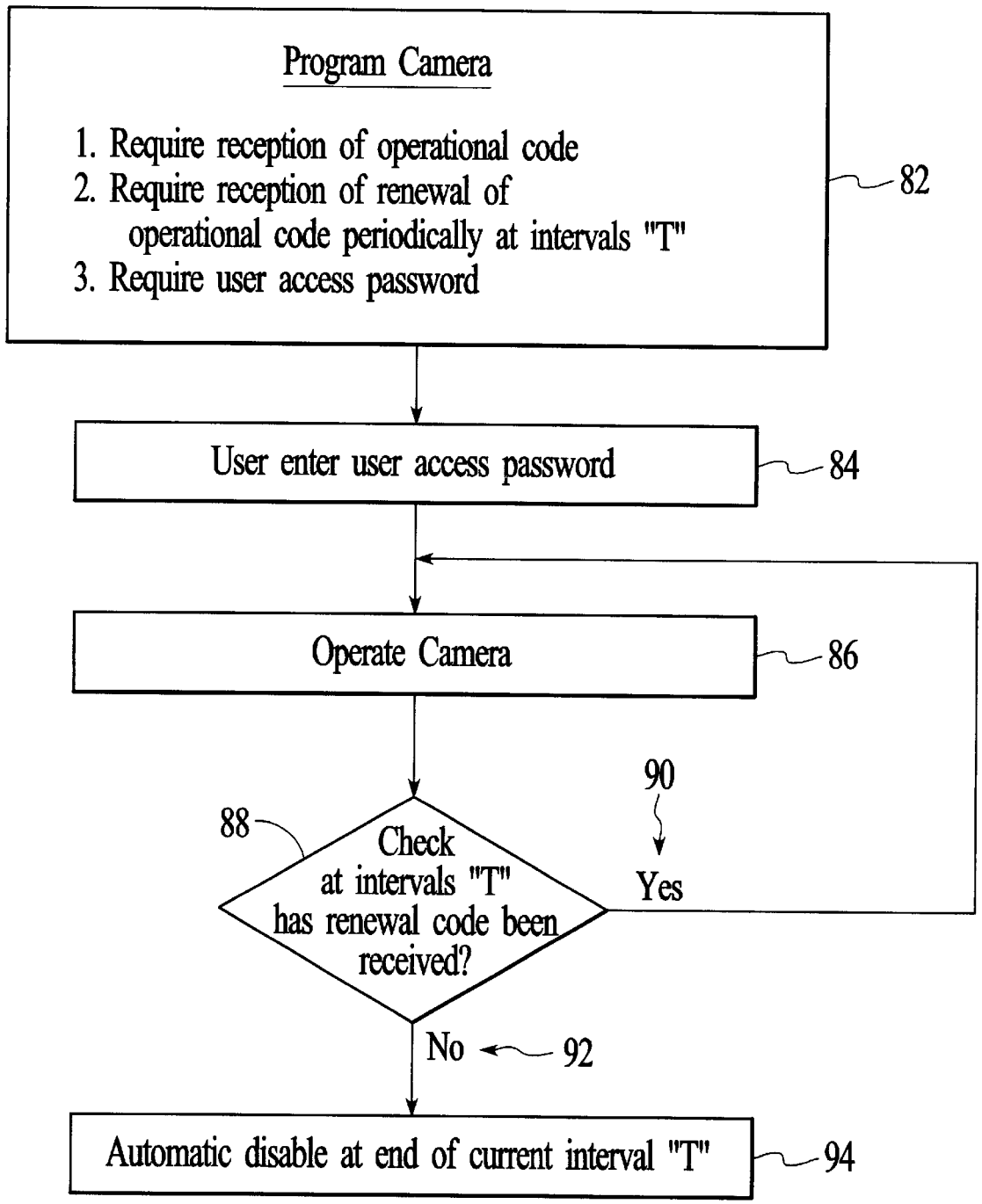
FIG. 5 illustrates the camera programming and operation in a system wherein the camera must detect a modulated, radiated signal in order to continue operation.

FIG. 5 presents an alternative embodiment that automatically renders the camera inoperable if it is removed from an authorized zone of operation. A typical application would be a factory in which a number of expensive digital cameras are used. Another example would be a tourist place such as a theme park. Referring to FIGS. 1 and 2, the camera in this embodiment includes a receiver 30 for reception of a signal radiated by a transmitter 28. In the "factory" example, the transmitter would be centrally located and designed to radiate a signal that would not extend substantially beyond the factory perimeter. The camera 10, including the receiver 30 (FIG. 2), will not operate if the signal from the transmitter 28 is not received.

Referring again to FIG. 5, the camera 10 is programmed to require reception of an operational code in order to function (block 82). The camera 10 is further programmed to check for a renewal of the operational code at periodic intervals of time $\Delta T$, or at the occurrence of a specific initialization process such as when starting up the camera, or prior to taking a picture. If the renewal code is received 90, operation can continue. If the renewal operational code is not received 92, the camera according to the program, shuts down the camera operation (block 94). The owner can also optionally program a required user access password (block 82) for the purpose of deterring unauthorized use within the otherwise operational physical boundaries/zone. In operation, a user would enter his user access password (block 84) and operate the camera (block 86). The transmitter 28 repeatedly broadcasts the operational code. The camera checks for a renewal of the code transmission (block 88). If the camera 10 receives a renewal of the operational code (90), the camera continues to be operational. If no renewal of the code is received (92), the camera automatically shuts down operation (block 94).

Figure 6A:
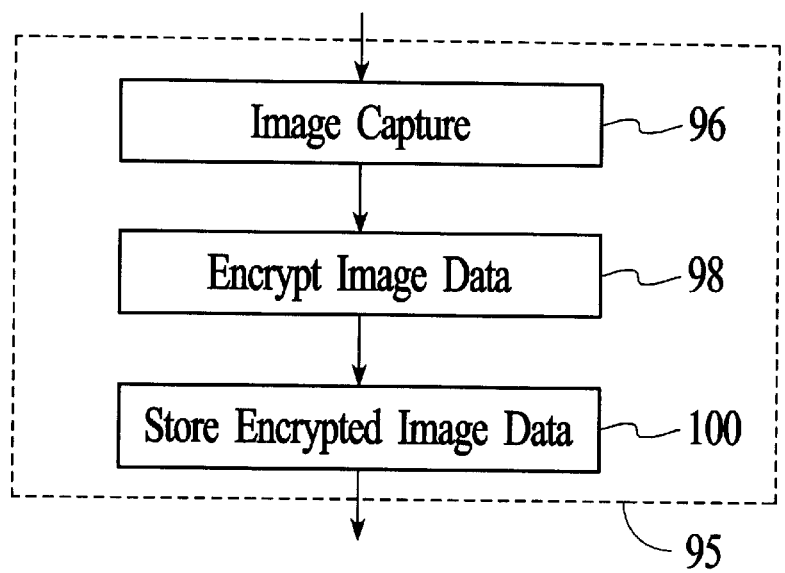
FIG. 6A is a flow chart showing further detail of the "operate camera" process of FIGS. 4 and 5.
Figure 6B:
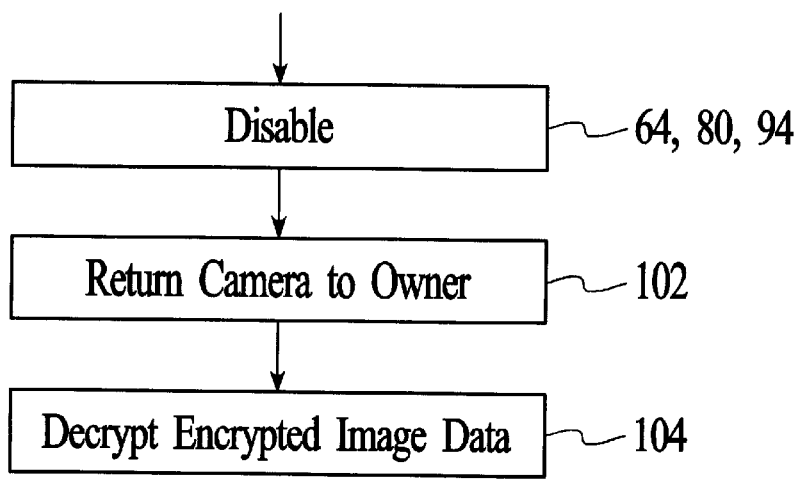
FIG. 6B is a flow chart illustrating the decryption process by an owner.

FIGS. 6A and 6B illustrate an alternate embodiment wherein an encryption procedure is performed on the image data, and then stored in the camera in an encrypted form. Only the owner has the key to decrypt the data, and as a result, a user is provided with an added incentive to return the camera in order to get a useable copy of the acquired image data.

Block 95 of FIG. 6A is a replacement for any of the "operator camera" blocks 56, 72, 86 of FIGS. 3, 4 and 5. According to FIG. 6A, in order to implement the encryption feature, the operate camera block 95 performs the process of image capture 96, followed by an encryption of the incoming image data 98, and then stores the encrypted image data 100. The camera then stores only the encrypted image data, the original then being available only to a person possessing a key, in this case the owner. A user must return the camera to the owner to get access to the original image data.

FIG. 6B illustrates the procedure of returning the camera, or camera and card to the owner. Following the camera disable (blocks 64, 80 or 94), the camera is returned to the owner (block 102). The owner then decrypts the encrypted image data and delivers it to the user (block 104).

Figure 7:
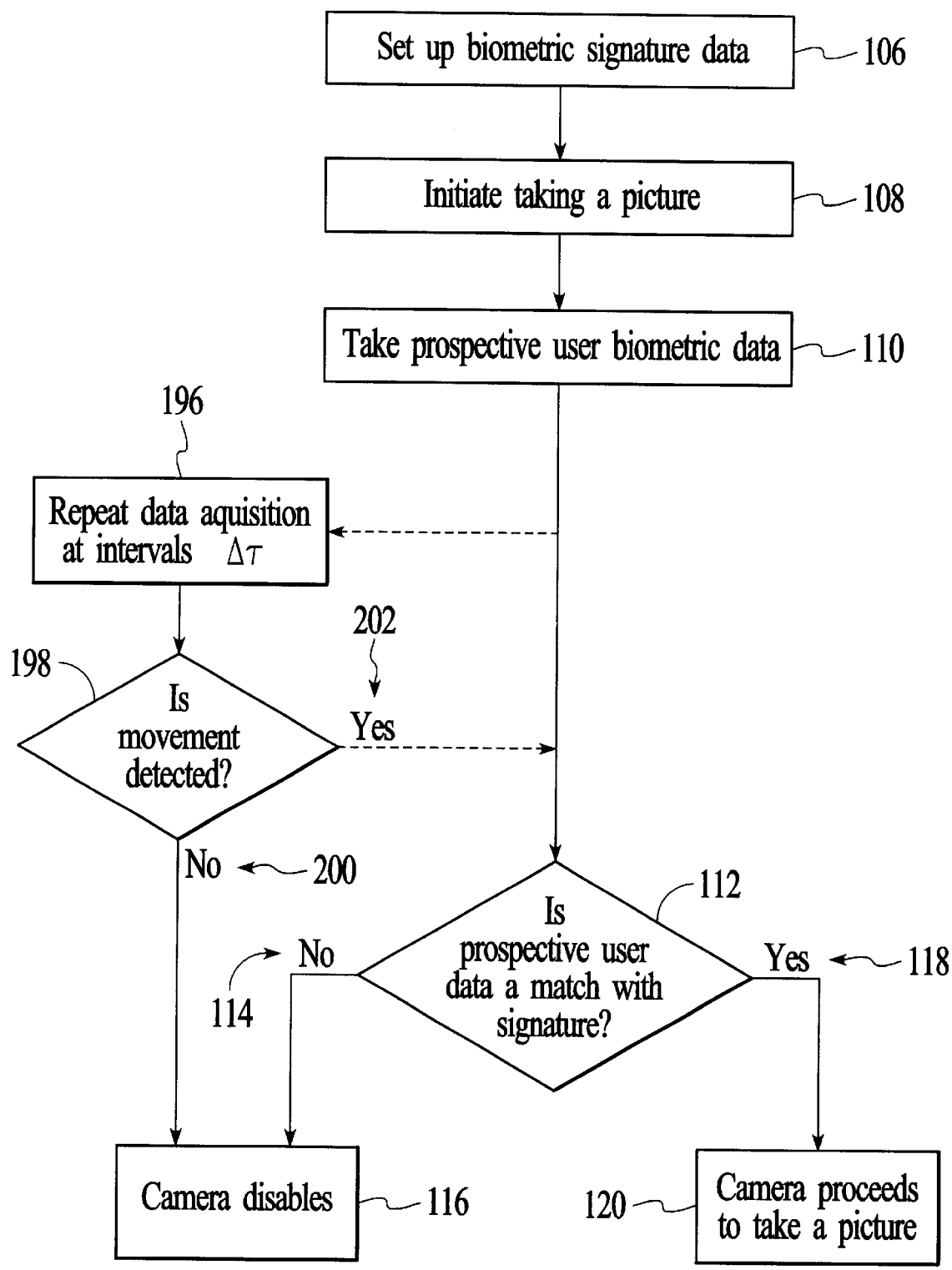
FIG. 7 is a flow chart illustrating implementation of biometric security in a camera.

Another embodiment of the present invention will now be described in reference to FIGS. 7–13. FIG. 7 shows the general concept wherein a biometric measurement system is included in a camera for the purpose of identifying and limiting operational access to an authorized user. In order to accomplish this, the camera is initially set up 106 with what would be called biometric signature data, taken from a measurement of a person authorized to operate the camera. The signature data is stored in the camera, and when a prospective user attempts to take a picture i.e. initiates taking a picture 108, the camera performs a measurement on the prospective user i.e., collects prospective user biometric data 110 and then compares 112 the prospective user data with the signature data. If the prospective user data does not match 114 the signature data, the camera automatically disables 116 and no picture is taken. If the prospective user data matches 118 the signature data, the camera proceeds 120 to take a picture. Items 196 and 198 in FIG. 7 refer to an alternate embodiment that will be fully explained later in the present disclosure.

Figure 8:
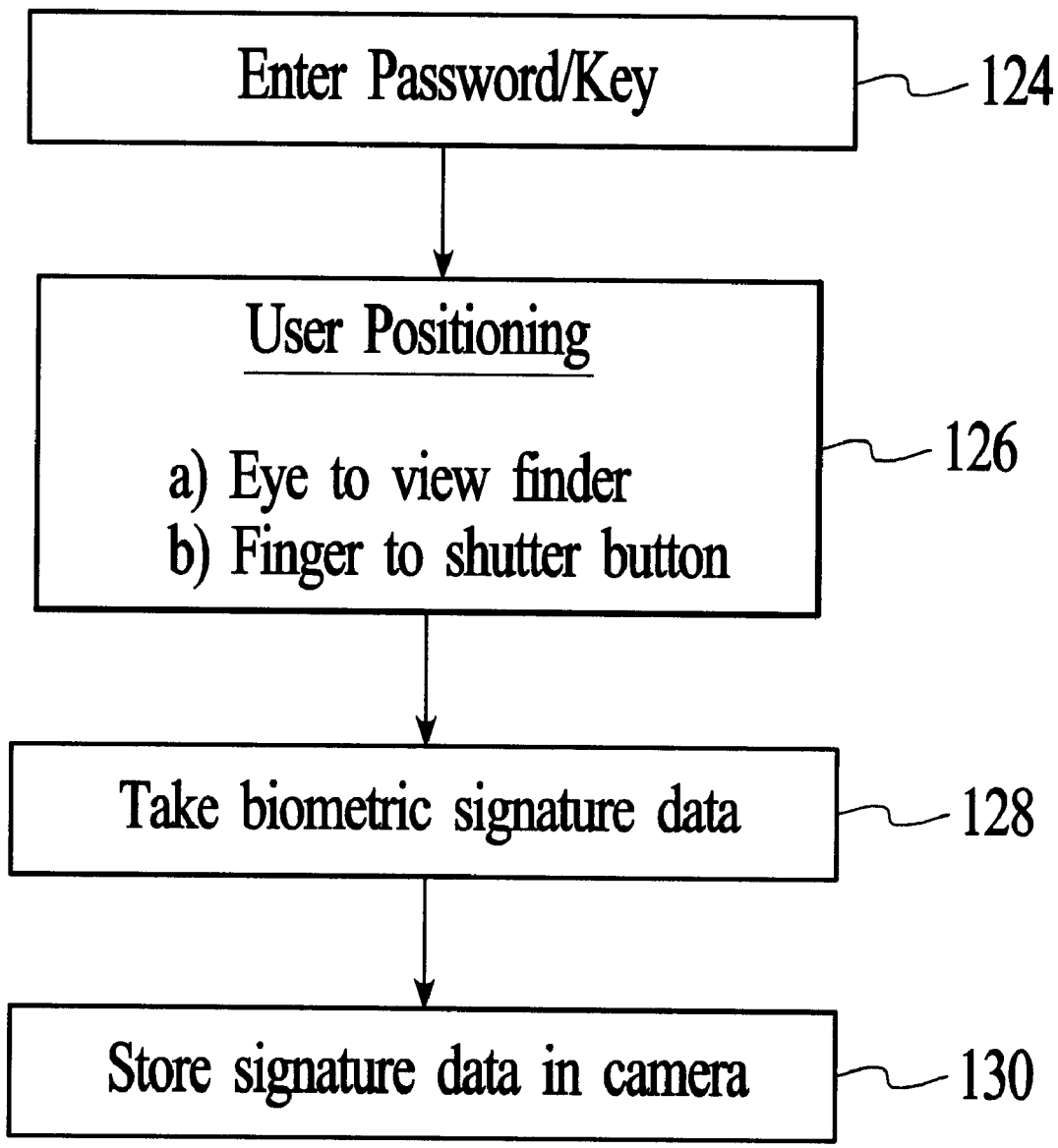
FIG. 8 is a flow chart giving details of setting up a biometric signature.

The process of setting up the signature data will now be illustrated more clearly in reference to FIG. 8. Refer also again to FIG. 1 with the assumption that the camera 10 now has the additional feature of biometric security as described above, including the programming required for accomplishing the creation of the signature data. In operation, a user enters 124 a predetermined password to instruct the camera to create signature data. This can be done through entry of a card, such as card 20 programmed for the purpose, or the password can be entered on a camera key pad such as pad 12 configured with sufficient keys for the purpose, or can be entered with a computer keyboard while connected to the PC 22, running corresponding software to authorize such an operation. In an alternate embodiment, the authorized signature data can be uploaded to the camera from the PC 20 or via a removable storage device such as card 20. The system may include a plurality of authorized users.

In order to make the measurement, i.e. acquire the biometric signature data, the authorized user places 126 his eye so as to look through the camera view finder, and/or places his finger on the shutter/activate button 122 (FIG. 1). The camera in response takes the biometric data 128, and processes and stores it as signature data 130. This signature data then remains in the camera, for example as part of a signature database, and is used to compare with biometric data taken of subsequent prospective users to assure that the camera will only function for the authorized user or users, as described above in reference to FIG. 7.

Figure 9:
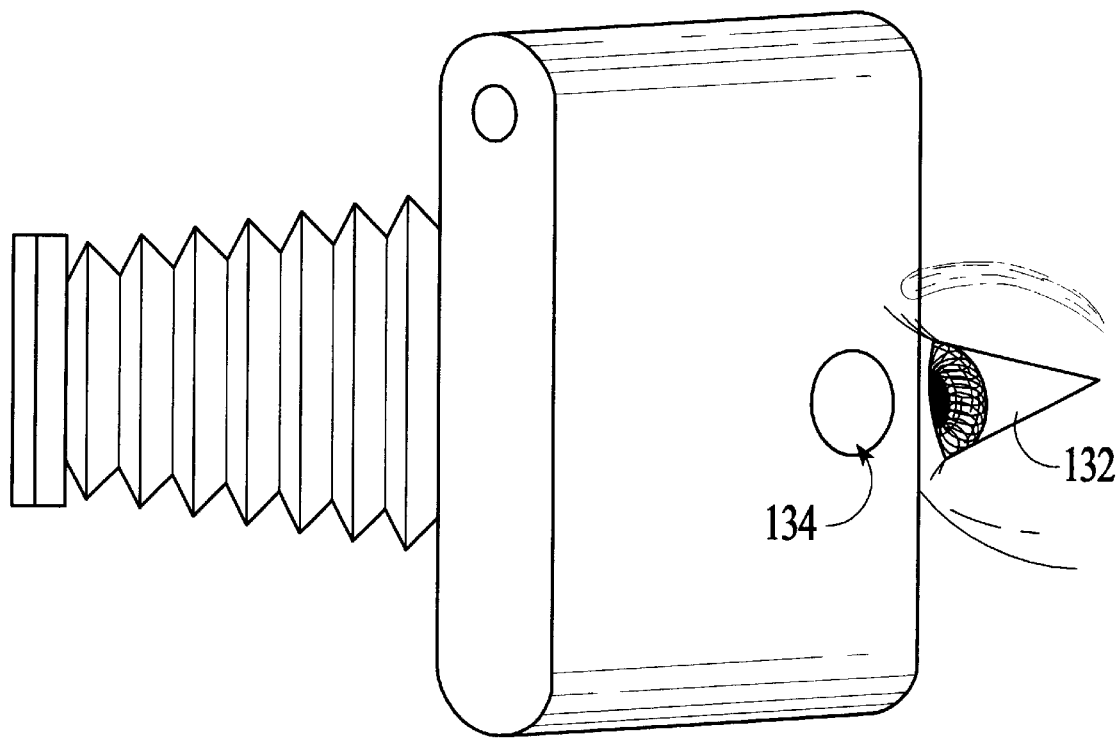
FIG. 9 illustrates a user's eye position for gathering iris data.
Figure 10:
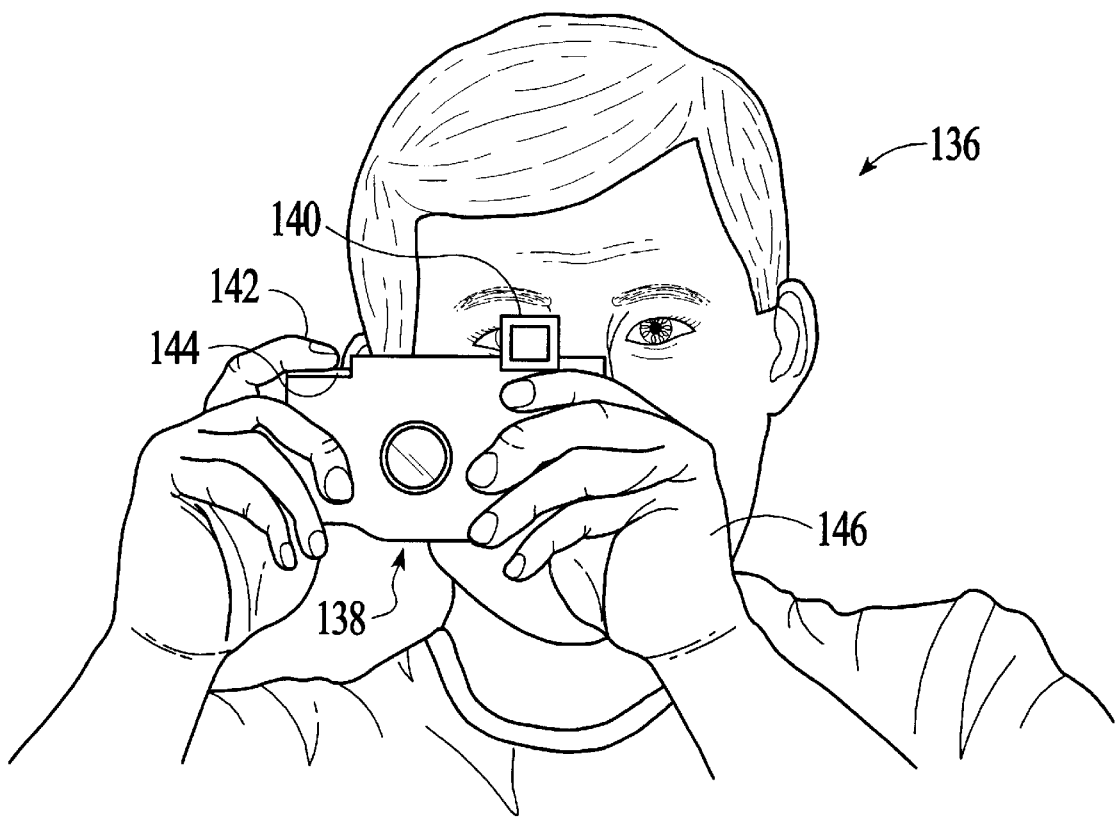
FIG. 10 illustrates locations on a camera where sensors can be placed for acquiring fingerprint and/or palm data.

FIG. 9 shows a user's eye 132 in proximity to a view finder 134. An advantage of the system is that the position of the eye is determined by the viewfinder, i.e. in order for a user to properly look through the viewfinder, the eye must be placed in a relatively fixed position. In this scenario where the eye is in effect anchored, it is easier to get an exact reading of the iris. FIG. 10 shows a user 136 holding a camera 138, with an eye in line with a view finder 140, and a finger 142 on a camera activation/shutter button 144. The system can be limited to an entry of a single finger, most likely the right hand index finger, this simplifying the process of data matching to a single database object per user, as opposed to the use of all ten fingers. FIG. 10 also shows contact between the camera and other fingers and portions of the user's hands, including the palm 146 of the user's hand. These other points of contact can be used in alternate embodiments for identification of a user by placing detectors in those locations, the detector(s) being similar in design to the one for gathering finger print data.

Figure 11:
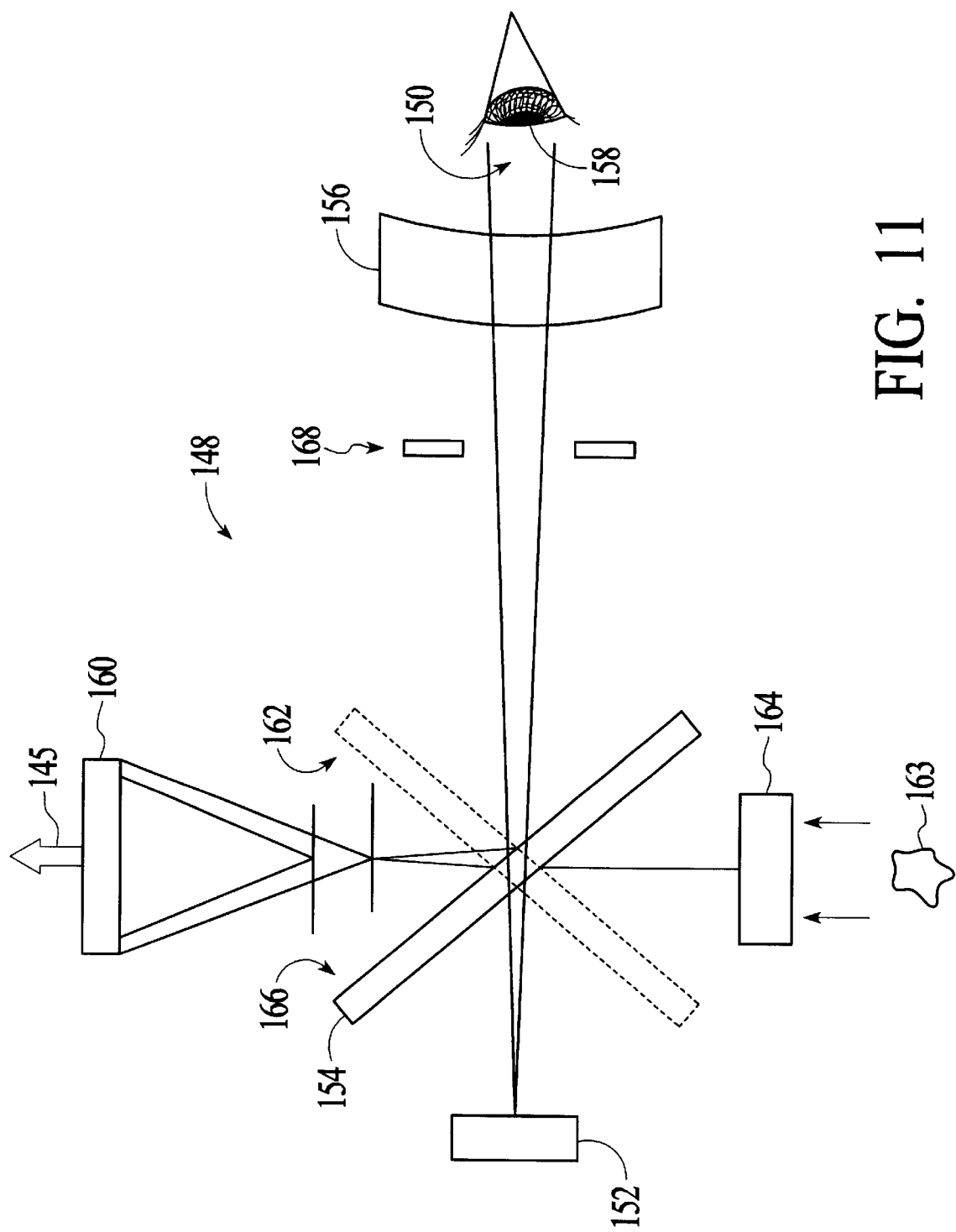
FIG. 11 shows details of an apparatus for acquiring iris data.

Referring again to FIG. 2, a biometric measurement apparatus 147 is assumed to be included in the camera 10 for the purpose of description of the present embodiment, coupled to the processor 32 through bus 145. FIG. 11 illustrates a particular embodiment 148 of apparatus 147 for gathering biometric data from the iris of a user's eye 150 as incorporated in a camera according to the present invention. Light is emitted from a source 152 and passes through a semi-reflective mirror/beam splitter 154 and through a viewfinder 156 to the user's eye 150. The source can be either light coming from the camera image taking lens such as in the case of a TTL (Through the Lens) parallax system, or from an internal source such as a lamp. The user's iris 158 reflects portions of the light, sending it back through the viewfinder lens 156. The reflected light is then reflected off of beam splitter 154 and directed to a charge coupled device (CCD) 160 where an electronic image of the iris is generated.

The output of the CCD 160 is sent to a processor, such as processor 32 in FIG. 2, that is programmed to process the data output of the CDD and compare it with the signature data from memory 42 and enable or disable the camera according to the process described in reference to FIG. 7.

The CCD 160 shown in FIG. 11 is the same CCD that is part of the image acquisition apparatus 46 of FIG. 2, the inclusion of which is understood by those skilled in the art as required and included in a digital camera. Similarly, the lens 164 and view finder 156 are standard parts included in digital cameras, the lens 164 also being included in the image acquisition apparatus 46. To this degree, the parts displayed in FIG. 11 as included in the biometric data acquisition apparatus 147 are shared elements with block 46 and block 147 is to that degree partially "symbolic" of function as well as structure. The arrangement of parts shown in FIG. 11 will enable those skilled in the art to reproduce the present invention.

The sequence of steps in the operation of the camera occur as follows. Initially, as described above, an authorized user presents a password/key enabling the camera to acquire and store the biometric data of the authorized user, which is termed "signature data". With the camera thus enabled by the password/key, the authorized user places his eye 150 to the viewfinder 156. At this point in the operation, the beam splitter is in position 162, as indicated by the dashed lines in FIG. 11. Apparatus for rotating the splitter 154 will be understood by those skilled in the art and need not be included in the present disclosure. With the beam splitter 154 in position 162, the user can view an image of an object 163, light from which passes through lens 164 and reflects off of splitter 154 in position 162, and through the viewfinder 156 to the user's eye 150. The authorized user then with his eye on the viewfinder, presses the activation/shutter button 122 (FIG. 1). At this point in the process, the camera automatically rotates the lens 154 to position 166 (solid lines), and activates the light source 152. The light then passes through the splitter 154 to the eye 150. A portion of the light then passes back through the viewfinder 156, and is reflected off of splitter 154 to the CCD 160 which detects the light and sends data signals through bus 145 to the processor 22 which creates the signature data.

With the signature data stored in the camera as described above, the camera is now ready to restrict its use to the authorized user. In operation, a prospective user picks up the camera, looks through the view finder 156 and presses the activation button 122 with his finger. The camera is programmed to set the beam splitter to position 162. This is the position in which it is set following the taking of a picture so as to allow a prospective user to view an object upon picking up the camera. Upon activation of the camera, the splitter 154 is rotated to position 166 and the biometric data is taken of the iris of the prospective user's eye. The camera then rotates the splitter back to position 162. The prospective user's biometric data is then compared by the processor with the signature data. If they are the same, i.e. a match, the camera takes a picture. The CCD 160 receives light from an object 163, the light having passed from the object, through the object lens 164 and splitter 154 and to the CCD 160. In order to assure that no leakage of light from the viewfinder reaches the CCD 160 while grabbing the image, a shutter 168 can be automatically closed just prior to and during the activation of the CCD 160. If the prospective user data does not match the signature data, the camera does not take a picture.

The details of how iris data is processed and compared with signature data is not included in the present disclosure. These details will be understood by those skilled in the art, as described in U.S. Pat. No. 5,291,560 by Daugman.

Figure 12:
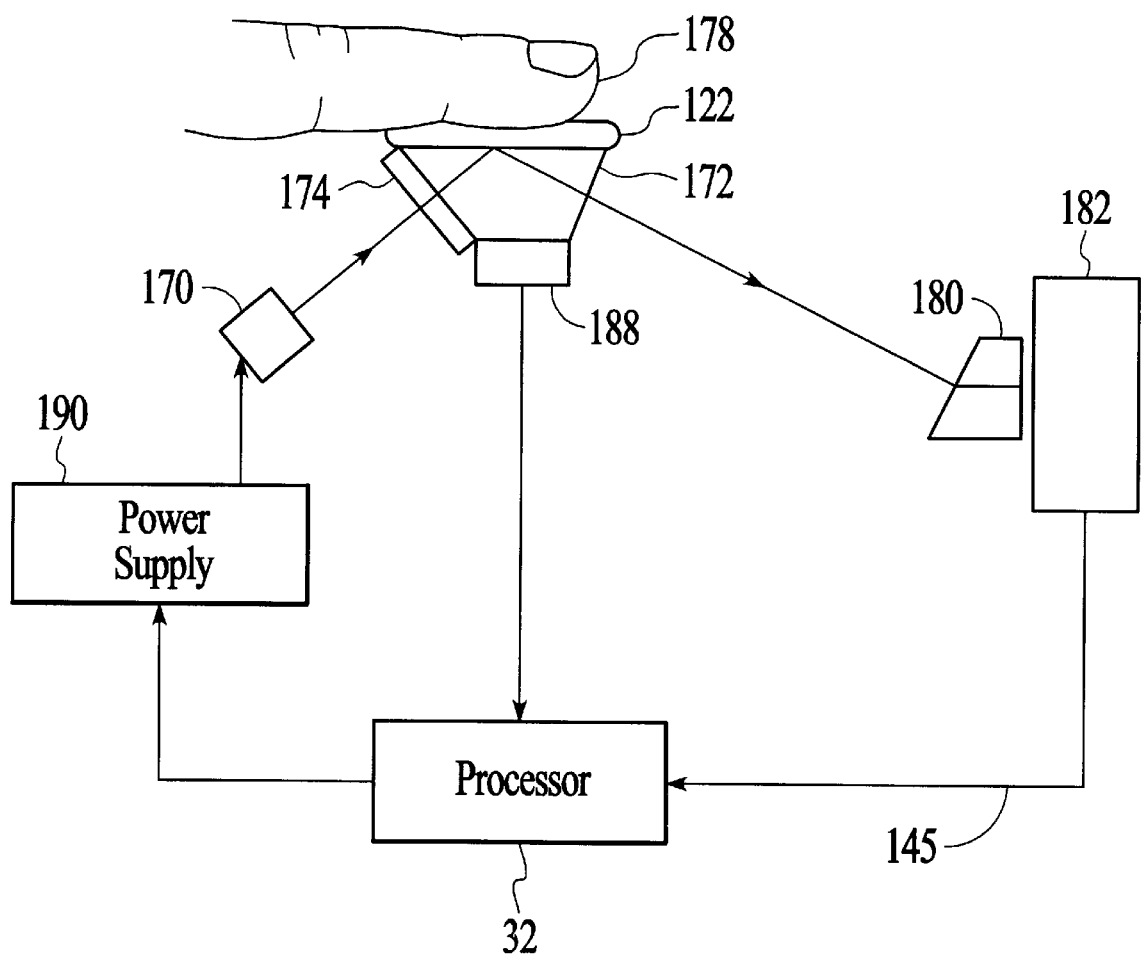
FIG. 12 shows details of an apparatus for acquiring fingerprint data.
Figure 13:
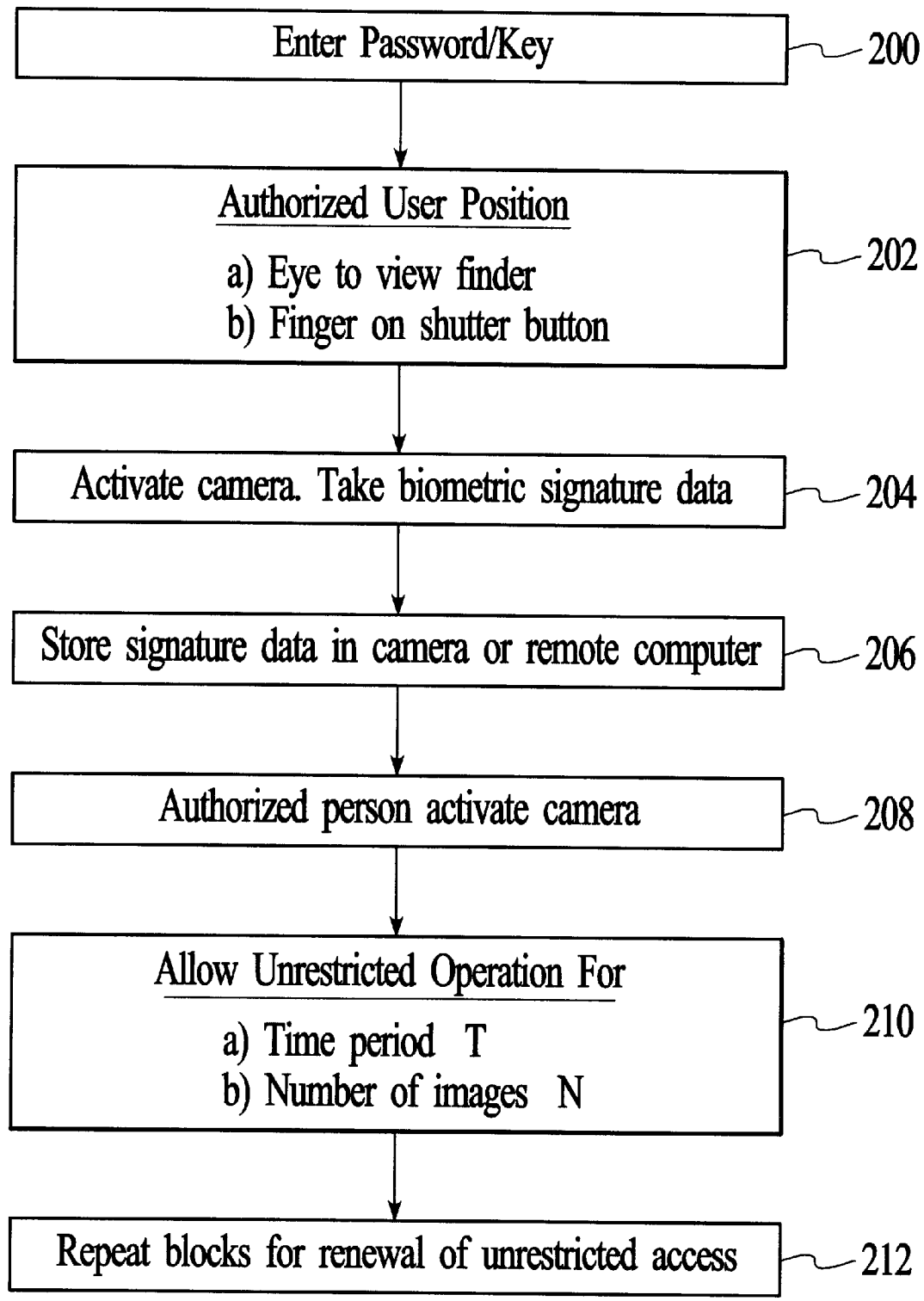
FIG. 13 illustrates a method wherein an authorized user can set the camera to allow unrestricted access to other persons for a limited time or for a limited number of pictures.

Referring now to FIG. 12 of the drawing, another embodiment of the disclosed concept of biometric security of a camera is presented wherein fingerprint data of a prospective user is acquired and compared with signature data, i.e. fingerprint data of an authorized person. If the prospective user's fingerprint data matches the signature data, the camera proceeds to take a picture. If the prospective user data does not match the signature data, the camera does not take a picture. The apparatus for acquiring the fingerprint data is illustrated in FIG. 12. A light source 170 is activated when a prospective user places his finger on the shutter release button 122 and over the prism 172 and activates the camera.

The shutter release button is preferably transparent, and may incorporate a magnifying lens. The light from source 170 passes optionally through a lens 174 and through the prism 172 and is reflected off of the finger 178 and passes out of the prism 172, entering a second prism 180 which directs the light to a CCD 182. The CCD 182 output 184 is sent to the processor 32 where either the signature data is prepared if the camera is activated with a password/key for preparation of signature data, or the prospective user data is prepared according to the procedure detailed above. In operation, when a prospective user presses the button 122, a microcontroller switch 188 is activated, causing a signal to be sent to the processor 32 to prepare to process fingerprint data. The processor 32 then activates the power supply 190, energizing the light source 170. The light then passes through the prism 172 to the finger 178, out the prism 172 and through prism 180 to the CCD 182, the output 184 of which is processed by the processor 32. Further details of the fingerprint data collection, and processing to determine if a match exists between a prospective user and signature data is not necessary herein. Such details are disclosed in U.S. Pat. No. 5,781,651 by Hsiao et al.

The second prism 180 is used to direct the light to the CCD 182. In this case, the CCD 182 is preferably a separate element from the CCD in the image acquisition apparatus 46. The output bus 145 is indicated in FIG. 2 as a separate bus, unassociated with bus 48.

According to the preferred embodiment of the camera with biometric security, the processing is confined to the camera body as indicated in FIG. 2 wherein the biometric data acquisition apparatus 147 collects the data, which is sent to the processor 32 via buses 145 and/or 48. The apparatus 147 includes either the iris data apparatus or epidermal apparatus including fingerprint or palm data apparatus, such as in FIG. 12, or the combination of both iris and epidermal apparatus. When both iris and epidermal apparatus are included, the processor can be programmed to require either a prospective user's iris data or epidermal data to match corresponding iris or epidermal signature data respectively. Alternatively, the processor can be programmed to require both a prospective user's iris and epidermal data to match the corresponding iris and epidermal signature data.

An alternative embodiment of the present invention includes programming of the processor to require movement of the iris and/or change in the pupil size as a function of change of relative brightness. This will guarantee that the image to be matched corresponds to a live iris versus a picture of one. This is accomplished by requiring that data be taken at specified closely spaced time intervals, and that a comparison of two sets of data at a particular coordinate show a variation/mismatch, and also requiring that the patterns of the two data sets both match the signature data. This is indicated in FIG. 7 by blocks 196 and 198. In order to stimulate an iris change, the light source 170 is designed to fluctuate in power, thus causing a contraction or expansion of the pupil. If no movement or change of the pupil's size is detected 200, the camera is disabled. If movement is detected 202, the pattern is tested for a match with signature data 112.

As an alternate embodiment adding an increased level of security, referring again to FIGS. 1 and 8, the camera 10 can be programmed to require reception of the password (block 124, FIG. 8), through connector 14 and cable 24 from a remote computer 22 connector 23. This adds security in making it more difficult for someone to enter a password and obtain unauthorized access to operate the camera.

As a further embodiment, the camera 10 can be programmed so as to operate only when connected to a remote computer 22. This connection can be done with a cable 24, (FIG. 1) or can be a wireless connection including a transceiver in camera 10 as indicated by antenna 18 in FIG. 1, and a transceiver 199 connected to the computer 22. In operation according to this embodiment, the camera receives a password from the remote computer 22 for preparing the signature data as with the above described embodiment. In addition, image data is immediately downloaded to the remote computer 22, minimizing the chance of any unauthorized person benefiting from using the camera in the event operational access is obtained.

A still further embodiment of the present invention is illustrated in reference again to FIG. 13 wherein an authorized user can activate the camera to allow unrestricted access for a set time period or set number of images. As in the above described embodiment, an authorized user must first be established by entry of a password or key (block 200) for the purpose of measuring/acquiring biometric data of the authorized user (blocks 202 and 204) for storage (block 206) in the camera, or in an embodiment requiring a connection to a remote computer, the signature data can be stored there.

According to this embodiment, the authorized user can then activate the camera (block 208) by positioning his eye at the view finder and/or pressing the finger on the activation button. The camera recognizes the authorized person by comparing new biometric data taken at this time with the stored signature data and allows access. According to this alternate embodiment, the camera then allows unrestricted operation by any person for a set time period, or for a set number of images or both (block 210). The specific time period or number of images can be either pre-set in the camera, or can be entered through use of the key pad 12. When the time period or number of images has expired, access can be renewed (block 212) by repeating blocks 208 and 210.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A digital camera apparatus comprising:
   (a) a digital camera, said camera including a camera housing having a built-in conversion apparatus for converting a light image to digital image data;
   (b) biometric data apparatus built into said camera housing, said biometric data apparatus functioning independently of said conversion apparatus for acquiring signature biometric data representing a body part of an authorized person and for measuring prospective user biometric data from a prospective user, wherein said biometric data apparatus includes
      (i) a light source for illuminating said iris;
      (ii) a charge coupled device (CCD) for detecting an image; and
      (iii) a beam splitter positionable to a first position for a user viewing an object, and positionable to a second position for reflecting light from said iris to said CCD, and for passing light from said object to said CCD; and
   (c) computer apparatus built into said camera housing for directing said biometric apparatus and for analyzing and storing said signature data, and for comparing said prospective user data with said signature data and for directing the taking of a picture if said prospective user data is a match to said signature data, wherein said signature biometric data is data derived from an iris of an eye of said authorized person, and said prospective user data is data derived from an iris of an eye of said prospective user.

2. A digital camera apparatus comprising:
   (a) a digital camera, said camera including a camera housing having a built-in conversion apparatus for converting a light image to digital image data;
   (b) biometric data apparatus built into said camera housing, said biometric data apparatus functioning independently of said conversion apparatus for acquiring signature biometric data representing a body part of an authorized person and for measuring prospective user biometric data from a prospective user; and
   (c) computer apparatus built into said camera housing for directing said biometric apparatus and for analyzing and storing said signature data, and for comparing said prospective user data with said signature data and for directing the taking of a picture if said prospective user data is a match to said signature data, wherein said computer apparatus is further for directing said biometric apparatus to make a plurality of measurements of said body part to determine movement or change of said body part as a function of time and brightness.

* * * * *